United States Patent [19]

Stillwell et al.

[11] 4,043,198
[45] Aug. 23, 1977

[54] POSITIVE DISPLACEMENT FLUID FLOWMETER

[76] Inventors: Logan W. Stillwell, 1305 E. Second Place, Mesa, Ariz. 85203; George K. Riffle, 2632 E. Pincho Ave., Phoenix, Ariz. 85016

[21] Appl. No.: 743,275

[22] Filed: Nov. 19, 1976

Related U.S. Application Data

[60] Continuation-in-part of Ser. No. 648,865, Jan. 14, 1976, abandoned, which is a division of Ser. No. 579,507, May 21, 1975, abandoned.

[51] Int. Cl.[2] .................................................. G01F 9/00
[52] U.S. Cl. ........................................ 73/242; 73/114; 91/DIG. 4
[58] Field of Search ................. 73/114, 242, 248, 249, 73/250, 251, 239; 91/DIG. 4, 344; 222/335

[56] References Cited

U.S. PATENT DOCUMENTS

| 1,355,208 | 10/1920 | Bassler | 73/250 |
| 1,470,684 | 10/1923 | Cade | 91/342 X |
| 2,870,789 | 1/1959 | Bilaisis | 91/DIG. 4 |
| 3,344,667 | 10/1967 | Maltby | 73/239 |

*Primary Examiner*—Jerry W. Myracle

[57] ABSTRACT

A valving member is carried within the bore of a meter body having inlet and outlet ports. Chambers are formed within the bore on opposite sides of a piston slideably disposed about the valving member. In response to movement of the piston, valving member shifts axially within the bore to establish sequential periodic communication between alternate chambers and the inlet and outlet ports. After each shift, the valving member is latched by magnetic means.

10 Claims, 14 Drawing Figures

POSITIVE DISPLACEMENT FLUID FLOWMETER

The instant application is a continuation-in-part application of co-pending application Ser. No. 648,865, filed Jan. 14, 1976, now abandoned entitled "Vehicle Fuel Efficiency Computer System" which, in turn, is a divisional application of then co-pending application Ser. No. 579,507 now abandoned, filed May 21, 1975, entitled "Vehicle Fuel Efficiency Computer System", which parent application is now abandoned.

This invention relates to fluid flowmeters.

More particularly, the instant invention concerns a fluid flowmeter of the positive displacement type.

In a further aspect, the invention concerns a fluid flowmeter which is adapted for use in a fuel efficiency system for monitoring vehicle fuel consumption.

In order for an operator of a motor vehicle to compute the fuel efficiency of his vehicle, it is necessary for the operator to determine the volume of fuel consumed during a predetermined distance of travel. Generally, this is done by taking readings from service station gas pump registers and by taking direct reading from the vehicle odometer. The operator must then manually calculate the vehicle efficiency in terms of, for example, miles per gallon. This method is inaccurate and is also exceedingly inconvenient. As a result, most operators of vehicles do not have a realistic idea of the efficiency with which their vehicle operates. Further, calculating efficiency in this manner does not provide the operator with instantaneous indications of operating efficiency. Manual computations, being only an average, do not show the operator how fuel economy is altered by changes in driving conditions, speed, acceleration and the like.

Because of the problems of the aforementioned type, various attempts have been made in the prior art to develop practical and reliable fuel economy indicators for motor vehicles. Various apparatus can be found in the prior art for measuring fuel consumption. The most basic of these systems are mechanical systems involving a flow measuring device, such as a calibrated orifice, mechanically linked to speed indicating members, such as the vehicle speedometer cable. Obviously, such arrangements are inadequate and inaccurate and as such have not found wide acceptance.

More recently, electro-mechanical systems have been developed to provide fuel economy measurements. The systems incorporate a flowmeter into the fuel line to measure fuel flow between the supply thereof and the engine. Another device measures distance travelled or duration of engine run. Output from the two devices are received by an electronic apparatus, such as a computer, which calculates the fuel consumption per unit of distance or time and which in turn drives a suitable indicator to provide a readout.

Of primary immediate concern is the flowmeter used in fuel economy indicating systems. Flowmeters in common usage are of two general types. One class of flowmeters is referred to as the turbine type flowmeter, while the other is the positive displacement flowmeter. Each type of flowmeter has certain inherent limitations and the prior art is replete with attempts at improvement.

Turbine type flowmeters are defined as that type having a rotating actuator or impeller, the speed of which is increased or decreased in accordance with rate of fluid flow. Advantageously, the turbine type flowmeters are less expensive to manufacture and will function with a relatively low pressure drop. However, turbine type flowmeters do not display an acceptable standard of accuracy. Further, such flowmeters are not compatible with a pulsating fluid flow, as is generated in accordance with conventional fuel pumps.

In general, positive displacement flowmeters are defined as that type having a cylinder with a reciprocating piston therein. The piston divides the cylinder into two chambers, one on each side of the piston. Differential pressure across the piston causes axial movement of the piston. Movement of the piston in one direction fills one chamber and empties the other. As the one direction fills one chamber and empties the other. As the piston moves in the reverse direction, alternate chambers are emptied and filled. Since the volume of each chamber is known, the reciprocations of the piston can be sensed and the fluid flow computed. Positive displacement flowmeters can accommodate pulsating flow, but in general are exceedinly expensive to manufacture, and require a substantial pressure drop, usually in the range of 2 psi to 5 psi.

Certain design criteria are critical to the function of a piston-type positive displacement flowmeter. Timed, sequential valving is necessary for the alternating function of the chambers. That is, sensing means must determine that one chamber has been exhausted and the other chamber filled, and, correspondingly, the valving sequence must be initiated and the piston urged in a reverse direction. Fluid loss must be negated in order to maintain the accuracy of the device. The utility of the device is dependent upon the ability to detect reciprocations of the piston.

In accordance with an early prior art piston-type flowmeter, the valving members were detained in a prescribed position by mechanical latching means. As the piston approached the limit of travel, a cam surface carried thereby urged against the latch member to disengage the connection and the valving members shifted in response to energy stored in a spring by the moving piston. The use of the device was limited to systems of substantial volume and pressure, in order to generate the force necessary to actuate the mechanical latching means and overcome considerable internal friction. Wear on the camming surface resulted in ever-decreasing accuracy. Further, since any attempted rotation of the internal elements would bind the mechanism and render the device inoperative, the meter was restricted to stationary application.

To overcome the stated and other inherent limitations of the foregoing flowmeter, the art has more recently produced an electro-mechanical piston-type flowmeter. In this type of unit, two piston-cylinder arrangements are used. The first unit is a fluid controller, having a valving member therein which is shifted electro-magnetically. The piston in the second unit controls fluid volume. The two units are in hydraulic and electric communication. The electro-magnets are energized by a light-sensitive network which monitors movement of the piston in the second unit. While providing generally satisfactory results, it is immediately apparent that the apparatus is exceedingly complex, and expensive to manufacture. The sensitive electrical system is readily susceptable to damage and is dependent upon an external power supply. Further, since the cylinder of the second unit is of a transparent material, i.e., glass, the use of the unit in vehicular application is generally prohibited.

It would be highly advantageous, therefore, to provide a fluid flowmeter which will overcome the deficiencies of the prior art devices.

Accordingly, it is a principal object of the present invention to provide an improved flowmeter of the positive displacement type.

Another object of the invention is the provision of a positive displacement flowmeter which is integrally self-contained.

Another object of the invention is to provide a fluid flowmeter which is extremely accurate and subject to minimal error.

Still another object of the immediate invention is the provision of a flowmeter which is not readily susceptible to wear and will maintain accuracy for an extended period.

Yet another object of the invention is to provide a flowmeter which will operate effectively in any spacial attitude.

Yet another object of the invention is the provision of a piston-type flowmeter which will function in response to fluid flow having minimal pressure drop.

A further object of the invention is to provide a flowmeter in which the integrity of the fluid flow is preserved from accidental loss.

And a further object of the instant invention is the provision of a piston-type flowmeter having improved means for sensing the end of the piston stroke, and, accordingly, sequencing the valving mechanism.

Still a further object of the invention is the provision of a flowmeter which is capable of generating a signal that is compatible with conventional fuel monitoring systems.

And a still further object of the invention is to provide a flowmeter of the above type which is unencumbered, simply and durably constructed, and relatively inexpensive to manufacture.

Briefly, to achieve the desired objectives of the present invention in accordance with a preferred embodiment thereof, provided is a body having an axial bore which is closed at each opposite end. Inlet and outlet ports are carried within the body for respectively receiving and discharging fluid. Further provided are metering means including a valving member axially shiftable within the bore and a piston, slideable along the valving member. First and second chambers are defined within the bore on opposite sides of the piston. The valving member is shifted in response to the piston between a first position and a second position for establishing alternating sequential communication between the chambers and the inlet and outlet ports. Magnetic means exert a predetermined force to attract and hold the valving member in the first and second positions.

The foregoing and further and more specific objects and advantages of the present invention will become readily apparent to those skilled in the art from the following detailed description of preferred embodiments thereof, taken in conjunction with the drawings, in which.

Figure 1:
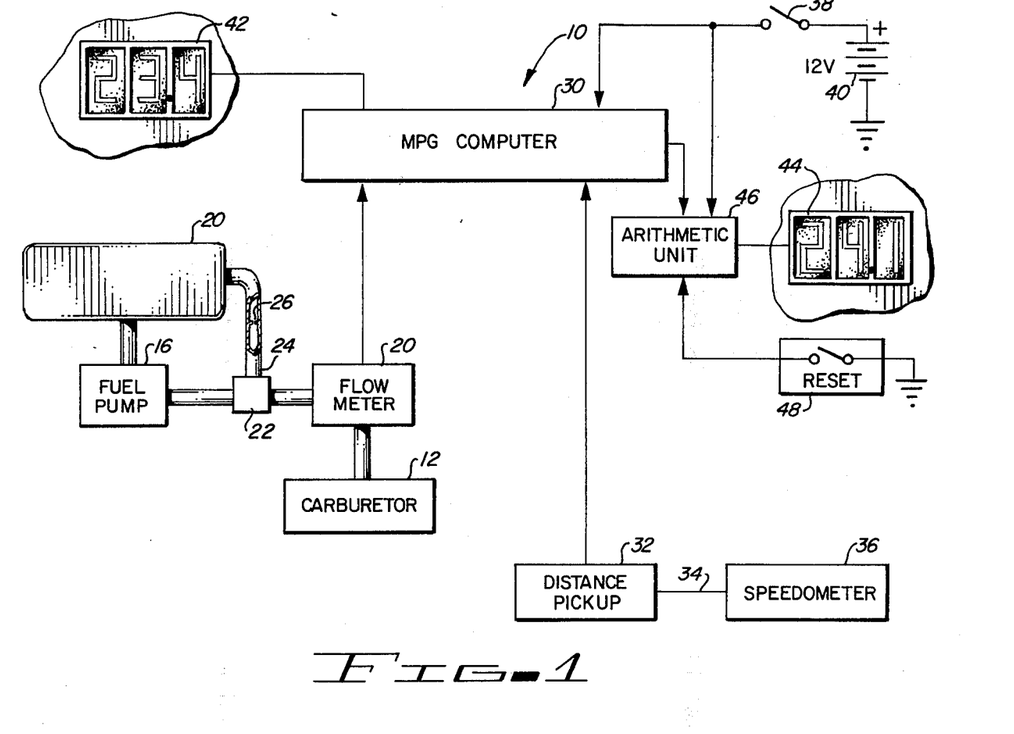
FIG. 1 is a block diagram of a fuel efficiency computer system incorporating the fluid flowmeter of the present invention.

Referring now to the drawings, wherein like reference numerals indicated corresponding elements through out the several views, FIG. 1 is a block diagram illustrating the fuel efficiency computer system of a preferred embodiment of the present invention identified by the numeral 10. The system will be described with reference to an automobile; however, it will be understood that the system can be used with any type of vehicle, as are commonly used for land, sea or air travel, or in stationary applications, such as laboratory work or in power plants. With a suitable computer, the system can provide any selected display of volumetric measure, such as miles per gallon, gallons per hour, gallons per minute, liters per hour, or any other meaningful measure. Further, the system is considered to be generally illustrative of fuel monitoring systems, the description of which is included herein to provide an enviromental setting for the flowmeter of the instant invention. Carburetor 12 supplies fuel to the vehicle engine in a conventional manner. Fuel is supplied to carburetor 12 from tank 14 by means of fuel pump 16. Typically, fuel pumps operate at pressure ranges of from approximately two to twelve psi. The volumetric quantity of fuel supplied to the engine is measured by flowmeter 20 which emits pulse signals with time periods inversely proportional to the rate of fuel flowing to the engine. Interposed between flowmeter 20 and fuel pump 16 is gravity liquid/vapor separator 22. Separator 22 includes a volume chamber for receiving fuel. The volume chamber is connected by a return line 24 to fuel tank 14. Orifice 26 and return line 24 impose a flow restriction in the return line so that vapors are allowed to return to the fuel tak and virtually only liquid fuel enters the flowmeter 20. In this way, vapor effects which would impair the accurate operation of flowmeter 20, are minimized.

The pulsed output from flowmeter 20 is received as an input at computer 30. For convenience of description and understanding, computer 30 will be referred to as mpg (miles per gallon) computer. It will be obvious that this is not by way of limitation, as any units of volume and distance, e.g., liters per kilometer, could be used with equal facility. In order that mpg computer 30 can provide the desired computation and give the visual indication of fuel efficiency, another input, in the form of a pulse signal representing the distance travelled, is received from distance pickup unit 32. Distance pickup unit 32 is mechanically connected to speedometer cable 34 of vehicle speedometer 36. A predetermined number of output pulses from distance pickup 32 represent a measure of distance travelled. For example, distance pickup 32 will emit one thousand pulses when the vehicle travels one mile. Mpg computer 30 is powered by an appropriate energy source, such as vehicle battery 40, across ignition switch 38. The visual indication of fuel efficiency can be read at display 42 which is conveniently located for driver observation, as, for example, on the instrument panel.

A second display 44 may also be provided on the instrument panel. Display 44 provides an indication of what may be termed "mpg average" which is the average fuel efficiency in terms of quantity of fuel per unit of distance travelled for a particular trip. This compution is performed by an arithometric unit 46, which receives binary data and control functions from computer 30. An appropriate manual reset 48 permits the vehicle operator to select the distance interval over which this average efficiency computation is to be made. A more complete understanding of the present invention will become apparent from the following detailed description of the various components of the fuel efficiency system 10.

Figure 2:
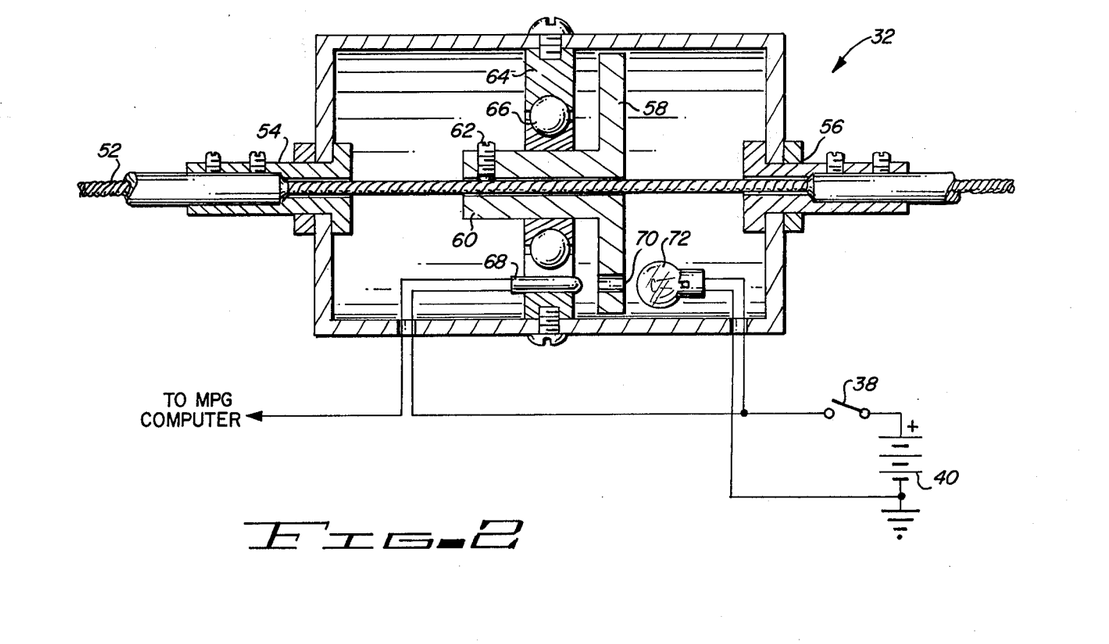
FIG. 2 is a sectional view illustrating the details of a distance pickup mechanism used in connection with the system of FIG. 1.

FIG. 2 illustrates in detail the distance pickup unit 32. Distance pickup unit 32 includes an appropriate housing or enclosure 50. Speedometer cable 52 extends axially through enclosure 50 and is received at opposite ends of the housing in sleeves 54 and 56, respectively, and drives the pickup unit. As is conventional, speedometer cable 52 rotates in relation to the speed of the vehicle. Mounting plate 64 extends transversely across the interior of enclosure 50. A bearing assembly 66 rotatively supports sleeve 60. Speedometer cable 52 extends axially through sleeve 60 and is connected to the sleeve for common rotation by set screw 62.

An interrupter disk 58 is affixed to one end of sleeve 60. It will be seen that rotation of speedometer cable 52 will impart rotation to interrupter disk 58. An aperture 70 is defined near the periphery of interrupter disk 58. A light source 72, as, for example, a low current lamp, is positioned adjacent timing disk 58. Light source 72 is suitably connected to battery 40 across a switch. A photodiode 68 is mounted on the opposite side of interrupter disk 58 in the proximity of light source 72. It will be seen that photodiode 68 is shielded from the light emitted by light source 72, except when aperture 70 is in the approximately rotative position shown in FIG. 2. When interrupter disk 58 is in this position, light emitted by lamp 72 will momentarily energize photodiode 68, causing a signal or a pulse to be relayed to mpg computer 30. Therefore, each revolution of the speedometer cable will cause a pulsed signal to be sent to computer 30 and computer 46. Therefore, a series of pulses proportional to the distance travelled by the vehicle are generated and relayed to the computers. The speedometer cable of most United States manufactured automobiles conventionally revolve one thousand turns per mile. Therefore, a direct adaptation of the speedometer cable as shown in FIG. 2 would result in photodiode 68 being subjected to the influence of lamp 72 one thousand times per mile of travel. Photodiode 68 will then emit one thousand pulses in a mile of vehicle travel.

Figure 3:
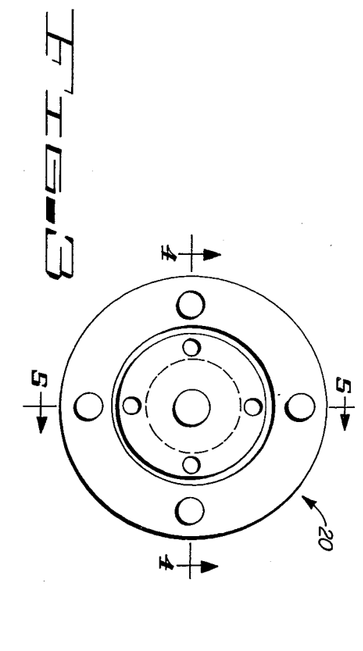
FIG. 3 is a side elevational view of the flowmeter for measuring fuel consumption.

The other parameter monitored necessary to the determination of engine efficiency is the volumetric quantity of fuel consumed by the vehicle engine. A signal proportional to the quantity of fuel supplied to the engine is provided by positive displacement flowmeter 20. The construction of flowmeter 20 is shown in detail in FIGS. 3 through 5. Referring to those figures, flowmeter 20 includes a generally cylindrical housing or body member 80 which defines an axial bore 82. Opposite ends of the bore 82 are closed by end plates 84 and 86, respectively. End plates 84 and 86 are of a ferro-magnetic material. The end plates are secured in place by appropriate fasteners, such as cap screws 88. A magnetically actuable switch 90, such as a reed switch, is housed in axial passageway 96 at the axial center of the valve. Reed switch 90 is connected by line 92 to power source or power source ground. Line 94 is connected by mpg computer 30 and provides a pulsed signal with time period inversely proportional to the rate of fuel flowing through meter 20.

Outlet port 102 is connectable by conventional fuel line and fittings to the inlet of carburetor 12. Similarly, inlet port 100 is connectable to fuel pump 16 to receive pressurized flow of fuel. As mentioned with reference to FIG. 1, a liquid vapor separator 24 is preferably interposed between fuel pump 16 and flowmeter 20.

Figure 4:
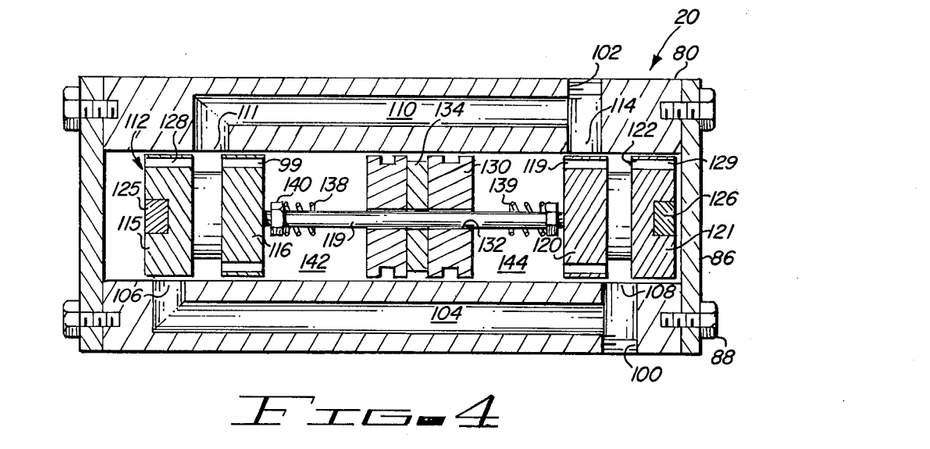
FIG. 4 is a sectional view taken along the lines 4—4 of FIG. 3.
Figure 5:
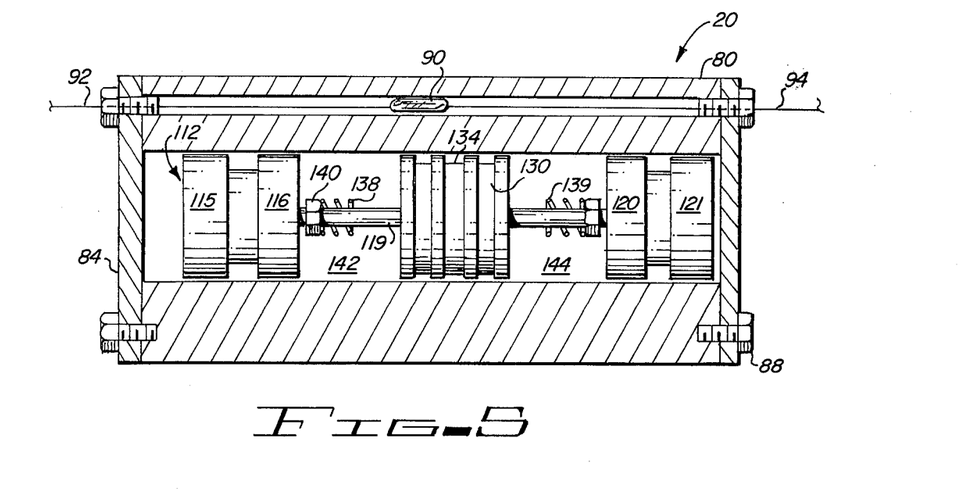
FIG. 5 is a sectional view taken along lines 5—5 of FIG. 3.

Axial flow passage 110 communicates with outlet 102. The opposite ends of outlet flow passage 110 also communicate with the valve bore 82 at radial ports 111 and 114. Similarly, axially extending inlet passage 104 communicates with valve bore 82 at radial ports 106 and 108. A metering member including spool assembly 12 and piston 130 is reciprocally positioned within valve bore 82. Spool assembly 112 includes spool members 115, 116 and 120, 121, respectively, carried on opposite ends of rod 118. Spool members 115 and 116 are separated by annular groove 117 which corresponds longitudinally in width to the width of ports 111 and 106. Similarly, spool members 120 and 121 are separated by an annular groove 122 which corresponds in longitudinal width to ports 114 and 108. Axial passageway 99 and 128 extend through spool members 116 and 115, respectively. Similarly, axial passageways 119 and 129 extend through spool members 120 and 121, respectively.

Preferably, spool assembly 112 is fabricated from a lightweight, fuel-resistant material, such as aluminum. Synthetic materials, such as "Teflon", may also be suitable, in that the valve spool would have low inertia and low frictional characteristics. Magnets 125 and 126 are embedded in the outer surface of valve spools 115 and 121, respectively. As will be explained, magnetic attraction will exist between the end plates 84, 86 and the adjacent magnets 125, 126, respectively. When the spool assembly 112 approaches within a predetermined distance of the end plates, "snap action" will occur, drawing the spool into contact with that end plate.

Concentric piston 130 is axially slideable along spool rod 118 at bore 132 dividing bore 82 into volume chambers 142 and 144. An annular magnet 134 is carried on piston 130. A stop member 140 is mounted on rod 118 on either side of the piston. Compression springs 138 and 139 are carried on rod 118 in chambers 142 and 144, respectively. The compression springs have selected spring rates and store energy to overcome the attraction force of the magnets to shift the spool assembly 112 as will be seen.

Figure 6:
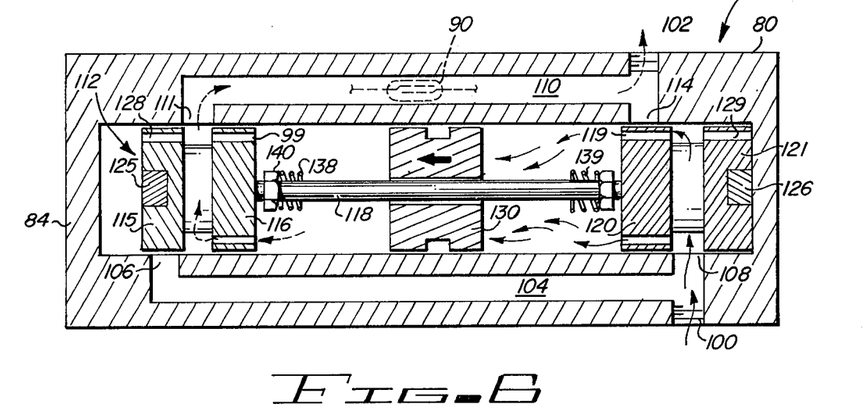
FIGS. 6–8 are diagrammatic views illustrating the operation of the flow metering device.
Figure 7:
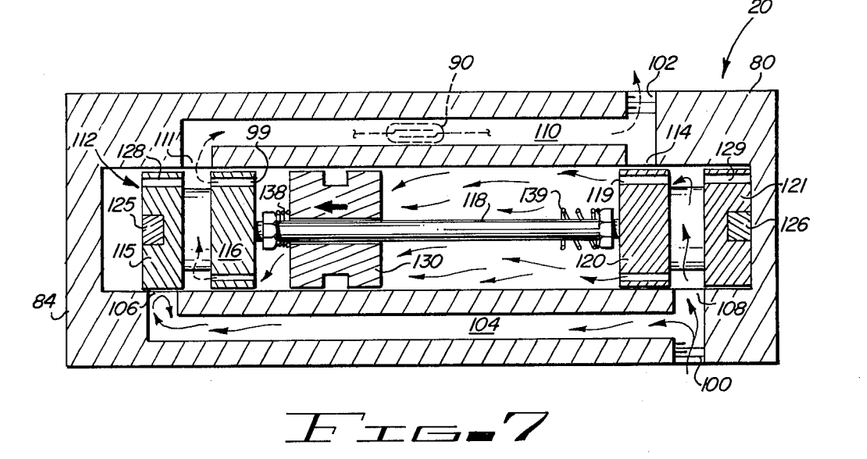
Figure 8:
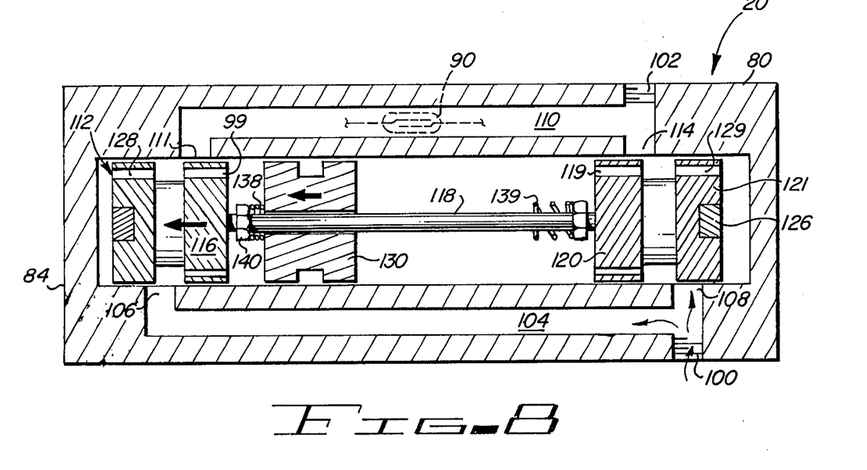

As mentioned above, meter 20 responds to flow through the flowmeter and sends a pulse signal to computer 30 indicative of the volume of fuel consumed. Flowmeter 20 will emit three pulses representing two volumes of the combined capacity of chambers 142 and 144. A more complete understanding of flowmeter 20 will become apparent from the following description of operation which is best seen in FIGS. 6 through 8. Assuming piston 130 is at the approximately mid-point, the sequence of operation of flowmeter 20 is as follows. Fuel entering flowmeter 20 at inlet 100 is admitted into the annular groove 122 between spool members 120 and 121 at port 108. The pressurized fluid, essentially at delivery pressure of the fuel pump which normally is approximately 2 to 12 psi, flows through passageway 119 in spool 120 into chamber 144. Pressurization and expansion of chamber 144 will urge piston 130 leftwardly, expelling fuel from chamber 142 through passageway 99 to outlet 102 via port 111 and passage 110. Port 114 is blocked by spool member 119 and port 106 is blocked by spool member 115. Piston 130 will move leftwardly until spring 138 is fully compressed against stop 140, thereby storing energy in the spring.

This position of the flow meter 20 is illustrated in FIG. 7. It will be noted that as piston 130 passes the mid-point of the valve housing, magnet 134 influences reed switch 90 causing the contacts of the switch to momentarily close. The closure of the internal contacts of reed switch 90 results in a pulse or signal to the computer via line 94. Once piston 30 passes by reed switch 90, the reed switch returns to its normally open position.

When piston 130 compresses spring 138 against lefthand stop 140, the fluid pressure in chamber 144 will cause piston 130 and spool assembly 122 to shift leftwardly overcoming the force exerted by magnet 126. The leftward shift of the spool assembly is caused by release of the energy stored in compressed spring 138. The magnetic attraction between magnet 126 and end plate 86 is greater than the force stored in spring 138. The movement of piston 130 in response to fluid pressure overcomes the magnetic attraction separating spool 121 from end plate 86, at which time the magnetic attraction is reduced to a force less than the force stored in spring 138. The necessary travel of spool 121 to diminish the magnetic attraction is extremely short, as will be explained hereinafter in greater detail. At this point, spring 138 shifts spool assembly 112 leftwardly with a rapid snap action. As spool assembly 11 shifts rapidly leftwardly, spool member 116 will close off port 111. Similarly, spool member 121 will close off port 108. Inlet passage 104 will be placed in hydraulic communication with annular groove 117 via port 106. Outlet passage 110 will be placed in communication with annular groove 122 via port 114. This position in the sequence of valve operation is illustrated in FIG. 8.

Fuel entering inlet 100 is now directed along passage 104, port 106, groove 117 and across spool passageway 118 into chamber 142. Pressurization of chamber 142 will reversely actuate piston 130 causing it to move rightwardly. Fuel in chamber 144 will be expelled to outlet 102 via passageway 119, groove 122 and port 114. Passages 128 and 129 serve to equalize pressure so that a vacuum is not created when the valve spool shifts.

As piston 130 moves rightwardly, it will again pass by reed switch 90, causing the switch contacts to momentarily close due to magnet 134. The closing of the switch contacts will send a pulse to the computers via line 94. When piston 130 reaches spool 120, spool assembly 112 will be moved rightwardly and the operational sequence explained above will be repeated and the piston will again reverse. It will be apparent that in a measuring cycle piston 130 will sweep twice the combined volume of chambers 142 and 144, filling and emptying each chamber once. After emptying each chamber, the piston passes through the center position, causing a signal to be emitted. Therefore, the concurrent emptying of each chamber and the emission of two signals constitute one measuring cycle. The total volume of chambers 142 and 144 can be selected according to any specific requirements.

The advantages of the reciprocating piston flowmeter design resides in accuracy and simplicity. Slight errors in the placement of the reed switch will not effect the accuracy of the valve since volume chambers 142 and 144 are each emptied twice in a single operational cycle.

The flowmeter is particularly adaptable in situations where low pressure differential exists across the flowmeter, as in the case of vehicle fuel systems. The flowmeter can also accurately integrate the pressure pulses caused by automotive type fuel pumps. The meter members including the spool assembly and piston operate at low pressure differentials. It will be appreciated that the flowmeter described above can be used in many other applications where precise flowmetering or measurement is required. This is particularly true in applications where the signal is to be processed in computer equipment. The resulting output is of a digital nature and is, therefore, compatible with a variety of electronic equipment for storing, analyzing and computing data.

Figure 9:
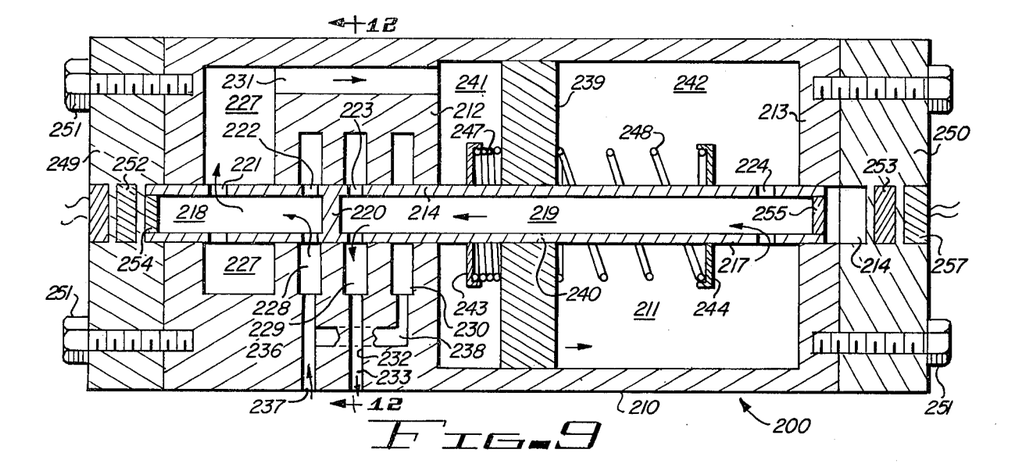
FIG. 9 is a longitudinal, vertical, sectional view of an alternate embodiment of a flowmeter constructed in accordance with the teachings of the present invention.

An alternate embodiment of a positive displacement flowmeter, generally designated by the reference character 200, is seen in FIG. 9. Similar to previously described flowmeter 20, flowmeter 200 is generally usable in various systems, and especially the system referred to in FIG. 1. Flowmeter 200 includes a generally cylindrical housing or body member 210 having a axial bore 211 which is closed at first and second ends, respectively, by end plates 212 and 213. For purposes of clarity of illustration, first end plate 212 is considered to extend from the left end of bore 211 to the left end of housing member 210, as shown in the drawings.

A second axial bore 214 extends through end plates 212 and 213 and provides a guide in which valving member 217 is slidably disposed. Valving member 217 is tubular, having first and second passages 218 and 219, respectively, therein on opposite sides of partition 220. Radial openings 221 and 222 extend through valving member 217 to communicate in spaced relationship with first passage 218. Radial openings 223 and 224 extend through valving member 217 and communicate in spaced relationship with second passage 219. The spacing of radial openings 221 and 222 and 223 and 224 wil become apparent as the description proceeds.

Figure 12:
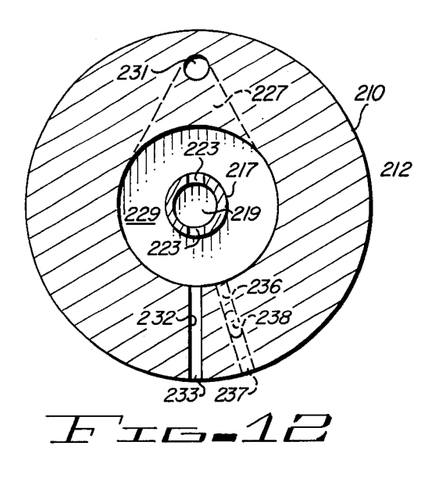
FIG. 12 is a vertical, sectional view taken along the line 12—12 of FIG. 9 and further illustrating the valving portion thereof.

First end plate 212 functions as a manifold having cavities 227, 228, 229 and 230 longitudinally spaced therein. As particularly seen in FIG. 12, cavity 229 is cylindrical, being concentric with valving member 217. The cross-section of cavity 229 as shown is typical of the configuration of cavities 227, 228 and 230. Passage 231 extends through end plate 212 and communicates between cavity 227 and bore 211. Passage 232 communicates between cavity 229 and the exterior of housing member 210. External end 233 of passage 232 is considered the fluid outlet and, as such, is preferably provided with connection means for engagement with a fluid conduit as shown communicating with carburetor 12 in FIG. 1. Similarly, passage 236 comunicates between cavity 228 and the exterior of housing 210, and defines an inlet port at the external end 237 thereof. Inlet port 237 receives a supply of pressurized fluid from a source thereof, such as fuel pump 16 illustrated in FIG. 1. Passage 238 is a branch of passage 236 providing communication between cavity 230 and inlet port 237.

Figure 13:
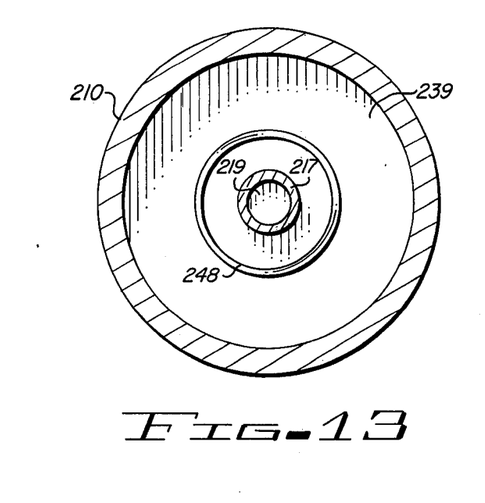
FIG. 13 is a vertical, sectional view taken along the line 13—13 of FIG. 10 and further illustrating the valving member and piston thereof.

A piston 239, as is also seen in FIG. 13, is reciprocally disposed within bore 211 and includes an axial bore 240 which is slideably received about valving member 217. First chamber 241 and second chamber 242 are defined within bore 211 on opposite sides of piston 239. Each chamber 241 and 242 has a variable volume as piston 239 reciprocates within bore 11. However, each chamber has a finite displacement in accordance with the design parameters set forth by the manufacturer. A reference example, citing specific sizes and design criteria, will be discussed hereinafter.

Annular flanges 243 and 244 are affixed to valving member 217 on opposite sides of piston 239. Compression spring 247 extends between piston 239 and annular flange 243. A similar compression spring 248 extends between annular flange 244 and piston 239.

First end cap 249 and second end cap 250 are secured to respective ends of housing member 210, as by cap screws 251 which extend through end cap 249 and threadedly engage first end plate 212 and through end cap 251 and threadedly engage end plate 213. Permanent magnets 252 and 253 are carried by end caps 249 and 250, respectively. First end target 254 and second end target 255 in the form of ferro-magnetic members are located at the respective ends of valving member 217, and are subject to the attraction of magnets 252 and 253, respectively. Proximity devices 256 and 257 are operatively connected with mpg computer 30, as schematically represented in FIG. 1.

The operation of fuel meter 200 is described in connection with sequential illustration presented in FIGS. 9, 10 and 11. For convenience of description, reference will be made to left-hand and right-hand. Left-hand refers to the end of meter 200, having first end cap 249, or in a direction closer thereto. Similarly, right-hand is defined as the end of meter 200, having second end cap 250, or a position closer thereto.

As seen in FIG. 9, valving member 217 has shifted to the extreme left-hand position. In this position, first passage 218 communicates with cavity 227 through opening 221 and also with cavity 228 through opening 222. Thus, inlet port 237 is in fluid communication with first cavity 241. Second chamber 242 communicates with outlet port 233 through opening 224, second passage 219, opening 223, cavity 229 and passage 232. Piston 239, as urged by fluid pressure in chamber 242, is in the extreme left-hand position, having compressed spring 247. The previous cycle of operation has filled chamber 242 with fluid. At the instant of the illustration, equilibrium exists within the device, and the components and fluid are at rest.

The commencement of the cycle is immediately after equilibrium and is traceable by the various arrows. Fluid, entering through inlet port 237, exerts pressure against the left face of the piston 239, commencing compression of spring 248 and discharge of fluid in chamber 242 through outlet port 233. Concurrently, relaxation of spring 247 is begun.

Figure 10:
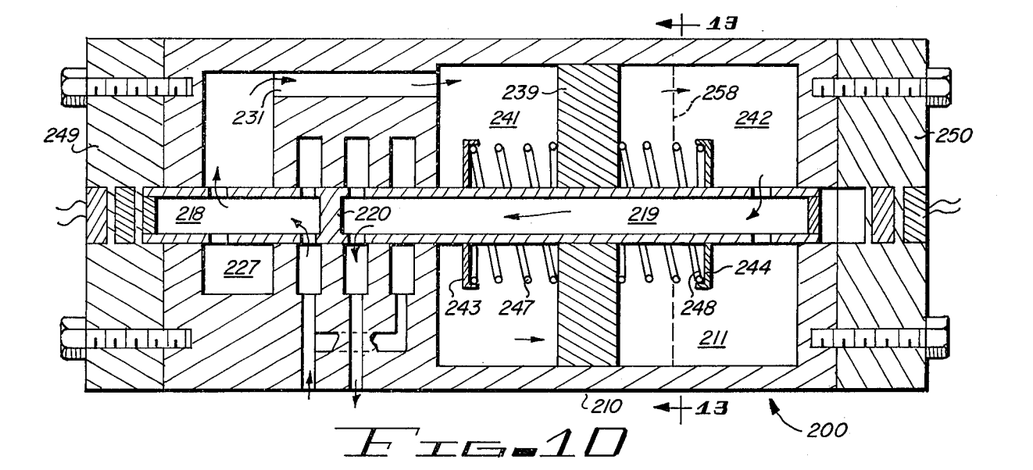
FIG. 10 is a view corresponding to the view of FIG. 9. and illustrating the components thereof during subsequent sequential operation.

The movement of piston 239 in response to fluid pressure continues, as seen in FIG. 10. Piston 239 has reached the mid-point of travel thereof, with springs 247 and 248 in equilibrium. Continued movement of piston 239 further compresses spring 248, storing energy therein and relaxes spring 247. Valving member 217 is still retained in the left-hand position by magnet 256. Fluid is being discharged from chamber 242 simultaneous with the filling of chamber 241.

As the right-hand face of piston 239 reaches the position indicated by dashed line 258, spring 248 is fully compressed. The force of the energy stored in spring 248 is less than the force of the attraction between end target 254 and magnet 252. However, the force of piston 239 in the direction toward the right-hand end of bore 211, as a result of hydraulic pressure against the left-hand face of piston 239, exceeds the force of attraction between end target 254 and magnet 252. It is also noted that since spring 248 is fully compressed between annular flange 244 and piston 239, further movement of piston 239 independent of valving member 217 is prohibited. Therefore, continued movement of piston 239 urges valving member 217 rightward, removing end target 254 from the influence of magnet 252.

The attraction between end target 254 and magnet 252 is inversely proportional to distance. The greater the distance, the less the attraction. At a given distance, which is relatively small, the attraction between end target 254 and magent 252 diminished to a force less than contained in compressed spring 248. At this instant, the force in spring 248 is released, sliding, with a snap action, valving member 217 rightward. As end target 255 approaches magnet 253, an attraction is established therebetween which, in combination with the force of spring 248, firmly shifts valving member 217 to the extreme right-hand travel. Equilibrium is again established within the device and one-half of an operational cycle has been completed. A pulse has been generated by the proximity sensing device 257 in response to the above described shift of valving member 217.

Figure 11:
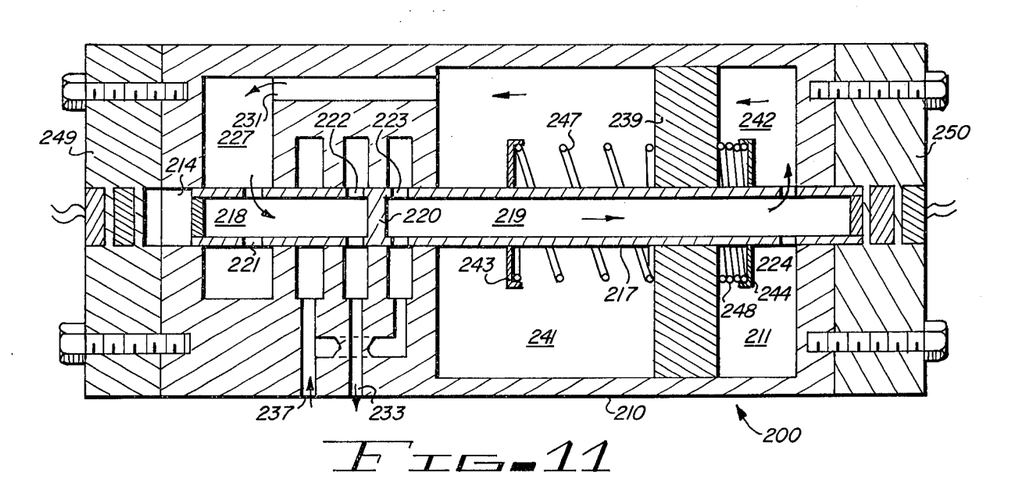
FIG. 11 is a view corresponding to the view of FIG. 9 and illustrating the components thereof at an operational sequence subsequent time of the illustration of FIG. 10.

The valving arrangement of valving member 217, after the rightward shift, is seen in FIG. 11. Opening 221 maintains communication between cavity 227 and passage 218 at all times, whether valving member 217 is shifted right or left. Similarly, continuous communication between chamber 242 and passage 219 is maintained through opening 224. Openings 222 and 223 are spaced along valving member 217 to align with cavities 228 and 229, respectively, when valving member 217 is in the left position, and, alternatively, align with cavities 229 and 230, respectively, when valving member 217 is in the right position. During the second half of the cycle of operation, chamber 241 communicates with outlet port 237, as shown by the arrows. Initial leftward movement of piston 239 is in response to fluid entering chamber 242 and the force exerted by spring 248.

From the foregoing description it is apparent that during one operational cycle, a volume of fuel is once displaced from each chamber 241 and 242. The volume of fuel is calculated by the distance between the appropriate stop member and the near face of piston 239. The displacement of each volume of fuel is detected by the appropriate inductance pickup unit 256 and 257, which are sensitive to the attraction between magnets 252, 253 and the appropriate target ends of valving member 217.

Figure 14:
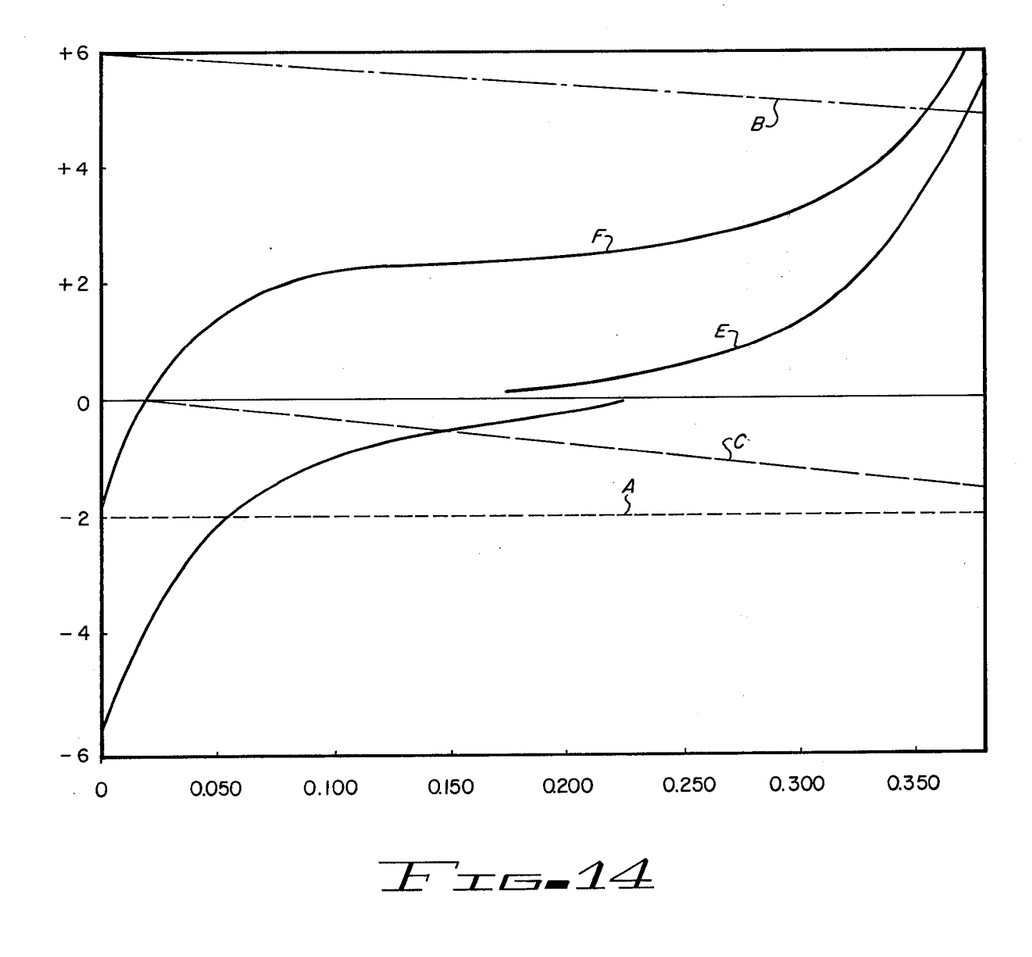
FIG. 14 is a force diagram useful in explaining the dynamics of the flowmeter of the instant invention.

A more comprehensive understanding and a greater appreciation of the advantages of the instant invention can be had with reference to FIG. 14, which is a diagrammatic illustration of the forces associated with a positive displacement flowmeter of specific design ceiteria constructed in accordance with the teachings of the present invention. The example is to be taken as illustrative and is not intended to be limiting upon the invention.

The graph of FIG. 14 is a compilation of test data and computations derived from a positive displacement flowmeter constructed in accordance with the teachings of the present invention and generally resembling the embodiment as previously described in connection with FIGS. 3–8. The data is set forth herein, not in a limiting sense, but rather as indicative of results yieldable with a device constructed in accordance with the teachings of the present invention and within certain specified design parameters of specific size, material and selection of components. The prototype included a bore of 1.3 inches, with a total piston travel of 1.78 inches. This resulted in a model in which each chamber, corresponding to chambers 41 and 42, had a displacement of 1.15 cubic inches. One operational cycle, therefore, received, measured and discharged 0.02 gallons, generating three signals, one each time the piston passed the reed switch. The model operated with ±1 percent accuracy during tests ranging from a flow of 1.5 gal/hour to 15 gal/hour.

Referring now to the graph, the forces associated with the shifting of the valving member are plotted. The abscissa of the graph is graduated in thousandths of an inch, with each fifty-thousandths designated, and extends for 0.375 inches, which represents the shift distance between positions of the valving member. The ordinate is graduated in ounces, with each two ounces indicated. The minus quantities, those below zero, refer to the resistance of the valving member to shifting from the immediate position, while the plus quantities, those above zero, refer to the attractive force for the valving member as it moves toward the new position.

The first force considered is the frictional resistance to moving as indicated by line A. The valving member, as well as the other internal components, exhibited a polished aluminum surface. Conventional O-rings, held in standard specification O-ring grooves, were used to provide seals between the various fluid cavities. As a result, two ounces of friction were produced. The forward and after springs, as represented by lines B and C, respectively, were chosen to have a compressed value of six ounces, and a spring rate of 3.4 ounces per inch of compression. Refer to springs 275 and 248. The magnets, refer to magnets 252 and 253, exerted a six-ounce pull at zero distance upon the end walls of the valving member. The magnetic attraction attributed to respective magnets is represented by lines D and E.

The result of the foregoing forces are plotted along the line F. It is seen that at the instant of comencement of movement for a shift, the value of the compressed spring negates the value of the magnet, leaving only the sliding friction to be overcome by the urging of the piston. By the time the piston has moved the shifting member approximately 0.015 inch, the magnetic attraction has dropped to slightly under four ounces, which, added to the two-ounce sliding friction, equals the force of the forward spring. At this point, the shifting member is in equilbrium. Continued movement of the valving member, as seen by line F, results in a positive shift towards the new position. At approximately one-half of the distance of travel, the valving member comes under the influence of the other magnet and the positive shifting force is accelerated.

It is seen, therefore, that in order to effect a shift it is necessary for the piston to move the valving member with a maximum but decreasing force of eight ounces for a distance of approximately 0.015 inch. The eight ounces is the accumulated total of holding the spring in the compressed position and the internal friction of the system. The resistance to moving displayed only by the valving member is two ounces. It is noted that the system detected the end of the piston travel within approximately 0.005 inch, and, accordingly, effected the shift of the valving member to reverse the direction of travel of the piston.

It is immediately apparent that a flowmeter constructed in accordance with the teachings of the present invention, as hereinbefore described in detail, noteworthy is the fact that the device is a self-contained unit of compact dimension. That is to say, the device may be placed in a fluid transmission line and function in response to the flow and pressure therein without external influence or connection to any type of accessory or supporting device. The simplicity of the unit substantially increases longevity and materially reduces susceptibility to damage or malfunction. Since all moving components are symmetrical about the longitudinal axis and relative rotation of the components is not a consideration, the device is operable without regard to spacial orientation either in static or dynamic application. The simplicity of the unit, which is in part responsible for the foregoing advantages, further results in a positive displacement type flowmeter which can be manufactured at a cost which is substantially less than heretofore believed possible.

Other advantages reside in the fact that the device, being of the positive displacement type, will readily accommodate fluid of continuous flow or pulsating flow. As seen from the foregoing example, the device will operate effectively in response to a pressure drop substantially less than is required by prior art self-contained units. The extremely low pressure drop, combined with the freedom from spacial fixation, results in a device that is applicable for aircraft use, especially accommodating certain types of aircraft with gravity flow fuel systems. A further related advantage particularly significant for sophisticated application, such as aircraft or laboratory use, arises from the fact that the device is positively sealed. There are no seals present which could fail, either in part or totally, and result in an external fuel leak.

The output from the flowmeter of the instant invention is of a digitial nature, and therefore negating drift commonly associated with time, temperature and humidity factors. The pickup for generating the output signal has been specifically described herein in connection with a reed switch and an inductance unit. It will be appreciated that the actual pickup unit in accordance with immediate design criteria is infinitely variable.

Also, it is noted as a further advantage that experimentation indicates that a flowmeter of substantially larger volume than that specifically described herein can be constructed in accordance with the teachings of the present invention and made to function without an appreciable increase in pressure requirements. In fact, with proper selection of materials, such as Teflon seals instead of rubber O-rings, the required pressure can be decreased.

It will be obvious to those skilled in the art to make various changes, alterations and modifications to the device of the present invention. To the extent that these changes, alterations and modifications to not depart from the spirit and scope of the appended claims, they are intended to be encompassed therein.

Having fully described and disclosed the present invention and the preferred embodiments thereof in such clear and concise terms as to enable those skilled in the art to understand and practice the same, the invention claimed is:

We claim:

1. A positive displacement flowmeter for receiving fluid from a pressurized source thereof and for contnuously dispensing said fluid therefrom in precise volumetric increments, said flowmeter comprising:
   a. a body defining an axial bore and having first and second opposite ends closing said bore;
   b. an inlet port in said body for receiving said fluid;
   c. an outlet port in said body for discharging said fluid:
   d. metering means including:
      i. a valving member axially shiftable within said body,
      ii. a piston reciprocally slideable within said bore defining first and second volume chambers on respective sides thereof,
   said valving member shiftable in response to said piston between a first position for establishing communication between said first chamber and said inlet port and between said second chamber and said outlet port, and a second position for establishing communication between said second chamber and said inlet port and between said first chamber and said outlet port; and
   e. magnetic means exerting a predetermined force for alternately attracting and holding said valving member to said first position and said second position.

2. The flowmeter of claim 1, wherein the direction of travel of said reciprocating piston is reversed in response to a shift of said valving member.

3. The flowmeter of claim 1, wherein said magnetic means are sensitive to the reciprocal movement of said piston, and said valving member is released from said attractive force in response to said piston reaching the limit of travel in one direction.

4. The flowmeter of claim 1, wherein said magnetic means exert a continous attractive force.

5. The flowmeter of claim 1, further including biasing means for receiving and storing energy from said piston and for releasing said energy to said valving member in response to said piston reaching the limit of travel in one direction for urging a shift of said valving member.

6. The flowmeter of claim 5, wherein said energy stored in said biasing means is in equilibrium with said force of said magnetic means.

7. The flowmeter of claim 1, further including sensing means actuable by said metering means for emitting a signal in relation to the volume of fluid passing through said meter.

8. The flowmeter of claim 7, wherein said sensing means includes:
   a. a magnetically actuable switch positioned along said body; and
   b. magnetic means carried on said piston,
   whereby said switch is momentarily actuated as the piston passes in proximity of said switch thereby emitting a signal proportional to the volume of flow through the flowmeter.

9. The flowmeter of claim 8, wherein said sensing means is sensitive to the magnetic attraction between said valving member and said magnetic means.

10. The flowmeter of claim 7, wherein said sensing means is actuated in response to a shift of said valving member.

* * * * *